Figures 1, 2:
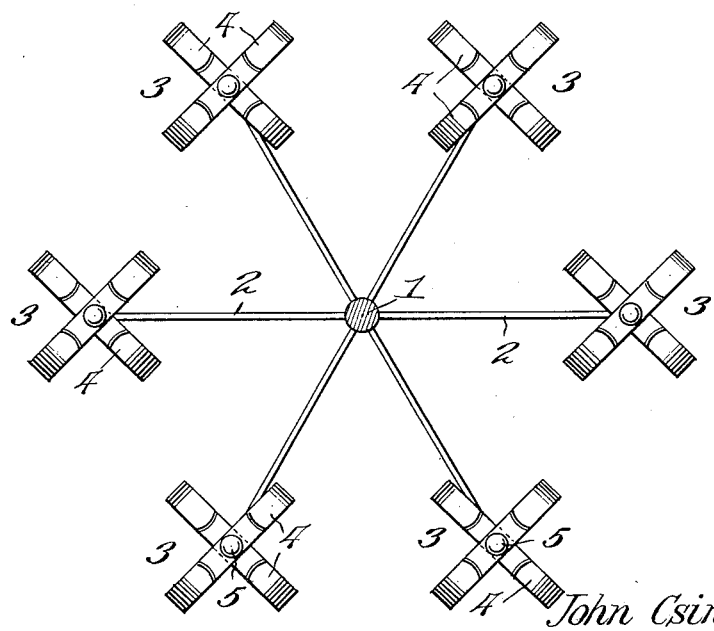

No. 886,954. PATENTED MAY 5, 1908.
J. CSINCSAK.
EGG HOLDER.
APPLICATION FILED OCT. 10, 1907.

Witnesses
Frank B. Hoffman
John F. Byrne

Inventor
John Csincsak
By Victor J. Evans
Attorney

UNITED STATES PATENT OFFICE.

JOHN CSINCSAK, OF CHICAGO, ILLINOIS.

EGG-HOLDER.

No. 886,954.   Specification of Letters Patent.   Patented May 5, 1908.

Application filed October 10, 1907. Serial No. 396,772.

*To all whom it may concern:*

Be it known that I, JOHN CSINCSAK, a citizen of the United States, residing at Chicago, in the county of Cook and State of Illinois, have invented new and useful Improvements in Egg-Holders, of which the following is a specification.

My invention relates to egg holders, and its primary object is to provide a device of this character by means of which a plurality of eggs may be inserted and supported within a boiler and removed therefrom when cooked.

A further object of my invention is to provide an egg holder with novel means adapted to carry a sand time glass.

A still further object of my invention is to provide an egg holder which is simple, durable and efficient, and one which may be manufactured and sold at a comparatively low cost.

With the above and other objects in view, the invention consists in the construction, combination and arrangement of parts hereinafter fully described, claimed and illustrated in the accompanying drawing, in which:

Figure 1 is a perspective view of an egg holder constructed in accordance with my invention, and Fig. 2 is a top paln view thereof, the handle being removed.

Referring to the drawing by reference numerals, 1 designates a vertical standard, to the lower end of which is secured a plurality of radially disposed arms 2, said arms forming the base of the holder. Egg receiving members 3 are secured to the outer ends of the arms 2, and each consists of two substantially U-shaped spring clamps 4. The clamps 4 of each egg receiving member are secured together at right angles with relation to each other by means of rivets 5, said rivets securing the egg receiving members to the arms 2. In view of the relative arrangement of the clamps of egg receiving member, an egg is adapted to be supported in an upright position, the clamps conforming to the contour of the egg and readily yielding during the application and removal of the same.

The handle 6 of the egg holder is constructed of a single strand of wire bent upon itself to provide an eye 7 by means of which the holder may be supported when not in use, and a loop 8, after which the arms of the strand are intertwisted to provide a stiffening section 9, the lower end of which is secured to the vertical standard 1. A guard 10 is secured to the handle 6 at a point between the eye 7 and loop 8, said guard providing means by which the holder may be removed from the boiler, and is preferably constructed of non-heat-conducting material. A sand time glass 11 is secured at its ends in a frame 12, which is pivotally mounted within the loop 8 upon brackets 13, said brackets being secured to the side bars of the loop.

In practice, the eggs are placed in the receiving members 3, after which the holder is inserted into the boiler. Immediately after the holder is inserted into the boiler, the frame 12 is turned to set the sand time glass. When the eggs are cooked, the holder is removed from the boiler by means of the guard 10, and if desired, the eggs may be served in the holder.

Changes in the form, proportions and minor details of construction may be made within the scope of the claims without departing from the spirit or sacrificing any of the advantages of the invention.

Having fully described and illustrated my invention, what I claim is:

An egg holder comprising a vertical standard, arms secured to and radially projecting from the standard, said arms forming the base of the holder, egg receiving members secured to the outer ends of the arms and consisting of U-shaped spring clamps, a handle secured to the standard and formed to provide a loop, brackets secured to the side bar of the loop, a frame pivotally mounted upon the brackets, and a time-glass carried by the frame.

In testimony whereof I affix my signature in presence of two witnesses.

JOHN CSINCSAK.

Witnesses:
AUGUST WALTER,
OTTO WALTER.